(12) United States Patent
Hsu

(10) Patent No.: US 8,197,002 B2
(45) Date of Patent: Jun. 12, 2012

(54) SEAT ADJUSTMENT DEVICE FOR BIKE

(75) Inventor: Jung-Yu Hsu, Tainan (TW)

(73) Assignee: Kind Shock Hi-Tech Co., Ltd., Tainan (TW)

( * ) Notice: Subject to any disclaimer, the term of this patent is extended or adjusted under 35 U.S.C. 154(b) by 225 days.

(21) Appl. No.: 12/818,205

(22) Filed: Jun. 18, 2010

(65) Prior Publication Data

US 2010/0320815 A1     Dec. 23, 2010

(30) Foreign Application Priority Data

Jun. 22, 2009    (TW) ................................ 98120957 A

(51) Int. Cl.
     *B62J 1/00*             (2006.01)
(52) U.S. Cl. ............ 297/215.15; 297/195.1; 297/215.13
(58) Field of Classification Search ............... 297/195.1, 297/215.13, 215.15, 463.1
See application file for complete search history.

(56) References Cited

U.S. PATENT DOCUMENTS

| | | | | |
|---|---|---|---|---|
| 5,244,301 A | * | 9/1993 | Kurke et al. ................... | 403/390 |
| 6,561,579 B1 | * | 5/2003 | Weir ........................... | 297/195.1 |
| 6,957,856 B2 | * | 10/2005 | Chiang et al. .............. | 297/195.1 |
| 6,988,740 B2 | * | 1/2006 | Bobrovniczky .............. | 280/276 |
| 7,059,672 B2 | * | 6/2006 | Saccucci ..................... | 297/195.1 |
| 7,562,933 B1 | * | 7/2009 | Chao et al. ................ | 297/215.13 |
| 7,681,947 B2 | * | 3/2010 | Ritchey ..................... | 297/215.14 |
| 2009/0174237 A1 | | 7/2009 | Chen | |

FOREIGN PATENT DOCUMENTS

| | | |
|---|---|---|
| CN | 2758163 Y | 2/2006 |
| TW | 258147 | 9/1995 |

\* cited by examiner

*Primary Examiner* — Laurie Cranmer
(74) *Attorney, Agent, or Firm* — Alan Kamrath; Kamrath IP Lawfirm, PA

(57) ABSTRACT

A seat adjustment device for a bike includes a holding base adapted to be engaged on a top of a support tube for a seat. First and second clamp blocks are received in the holding base. The second clamp block is moveable relative to the first clamp block. A bar-clamping space is formed between the first and second clamp blocks to clamp a support rod for the seat. An resilient member is provided between the first and second clamp blocks to bias the first and second clamp blocks towards an inner wall of the holding base. The first and second clamp blocks may be free to pivot around in the holding base, allowing the seat to be adjusted at a significantly increasing angle.

8 Claims, 13 Drawing Sheets

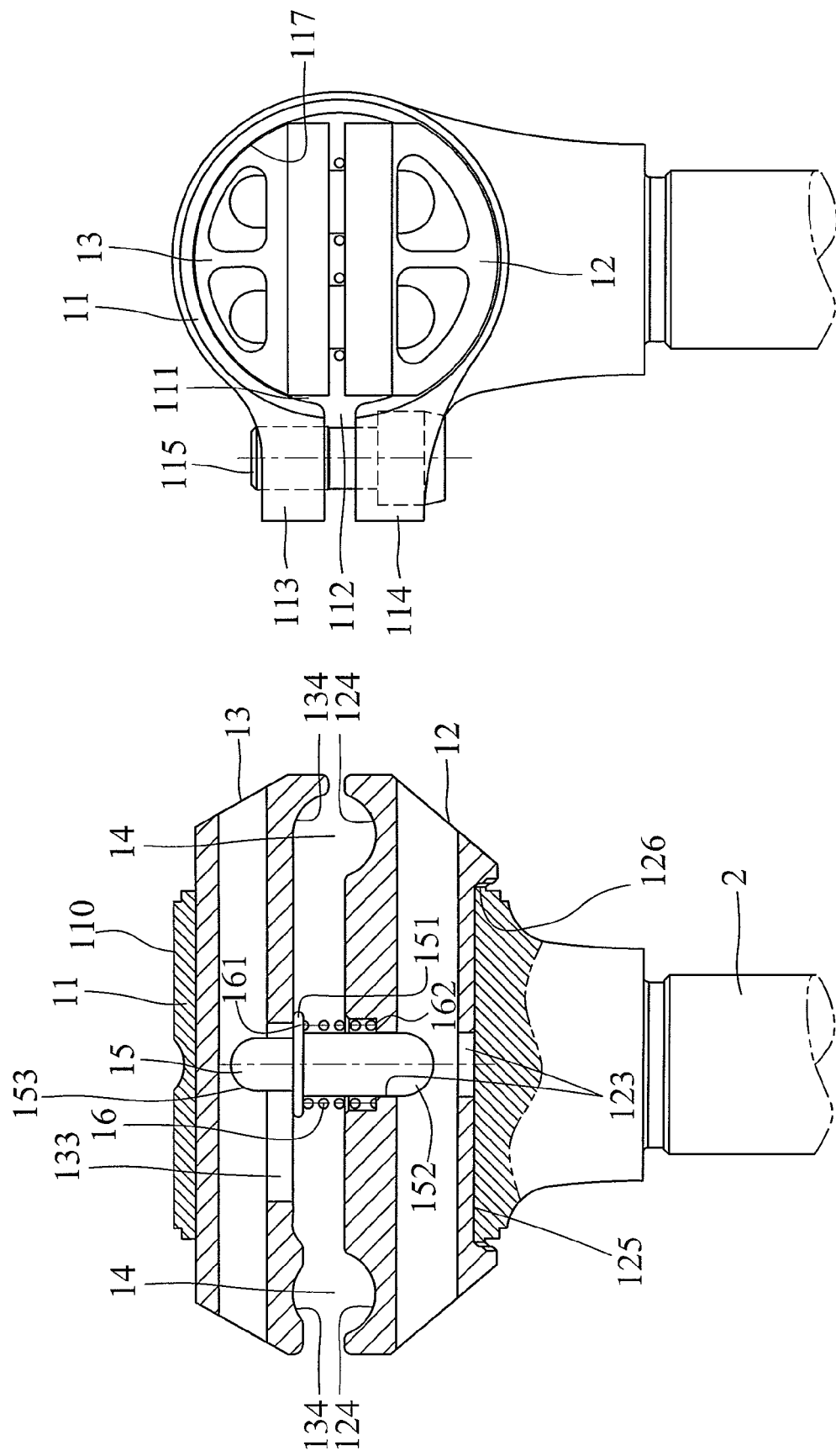

SEAT ADJUSTMENT DEVICE FOR BIKE

BACKGROUND OF THE INVENTION

1. Field of the Invention

The present invention relates to a seat adjustment device and, more particularly, to a seat adjustment device for a bike.

2. Description of the Related Art

Being disclosed in Taiwan Patent No. 258147, a bike seat adjustment device includes a C-shaped clamping seat extending from a top end of a stand pipe for a seat. An upper slide block and a retaining block are received in the clamping seat. The upper slide block is moveable relative to the retaining block. An upper notch is formed in a bottom side of the upper slide block, and an upper stop is provided on the upper notch. A clamping groove is formed in each of two sides of the retaining block. A lower notch is formed between the two clamping grooves, and a lower stop is provided on the lower notch. When the upper slide block relative to the retaining block is moved to a position where the upper stop of the upper slide block abuts against the lower stop of the retaining block, support rods for the seat can be mounted between the upper slide block and the retaining block and secured in the clamping grooves. Further, a screw is extended through the clamping seat and an arc-shaped slot of the retaining block and pressed on the retaining block, preventing the retaining block in the clamping seat from moving in an axial direction.

However, the conventional seat adjustment device has defects as follows.

1. The seat can be adjusted only at a small angle. Specifically, when the upper slide block and the retaining block pivot around in the clamping seat, they may pivot at an angle that is limited to a length of the arc-shaped slot, and thus the seat cannot be adjusted in a wide range of angle for the requirements of landforms and of folding of a bike for transportation.
2. The seat cannot be easily assembled. Specifically, when the clamping seat is loosened, the upper slide block will become loosely received in the clamping seat, so when installing the support rods in the clamping grooves, the user must simultaneously push the upper slide block for positioning, which is a troublesome assembly. Besides, during installing of the support rods, the loose upper slide block may cause noise.

BRIEF SUMMARY OF THE INVENTION

Therefore, it is an objective of the present invention to overcome the aforementioned shortcoming and deficiency of the prior art by providing a seat adjustment device for a bike, which allows a seat for the bike to be easily installed on a holding base. Further, the seat may be adjusted at a significantly increasing angle.

To achieve the foregoing objective, the seat adjustment device of the present invention includes a holding base adapted to be mounted on a top of a support tube for a seat. The holding base includes a ring body having an inner wall and a through-hole extending in an axial direction. A first clamp block is received in the through-hole of the holding base and includes a first face abutting the inner wall of the ring body and a second face opposed to the first face of the first clamp block. A second clamp block is received in the through-hole of the holding base and includes a first face abutting the inner wall of the ring body and a second face opposed to the first face of the second clamp block. The second face of the second clamp block faces and is spaced from the second face of first clamp block so that at least one bar-clamping space is formed between the second face of the second clamp block and the second face of the first clamp block. The second clamp block is moveable relative to the first clamp block in the axial direction. A resilient member is mounted between the first and second clamp blocks to bias the first and second clamp blocks towards the inner wall of the ring body.

In a preferred form, the first face of the first clamp block is an arc and formed with a groove including two ends abutting two sides of the ring body of the holding base. The second face of the first clamp block is formed with a first slot extending in the axial direction. The second face of the second clamp block is formed with a combining pillar. The combining pillar includes an outer end received in the first slot of the first clamp block and engaged with a connecting member to block the combining pillar from escaping from the first clamp block. The resilient member is a spring and mounted around the combining pillar.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 3 is a cross-sectional view of the seat adjustment device of FIG. 1;

FIG. 4 is a side view of the seat adjustment device of FIG. 1;

DETAILED DESCRIPTION OF THE INVENTION

Figure 1:
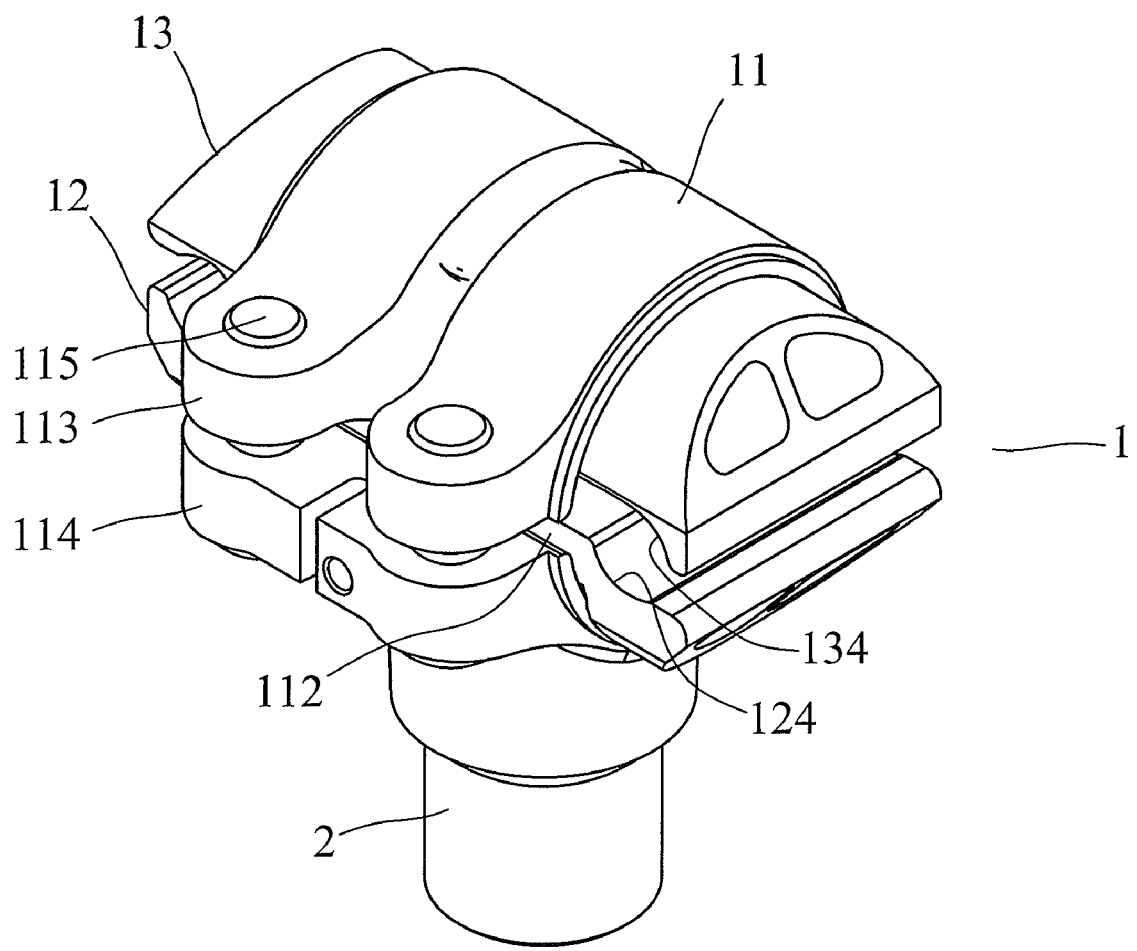
FIG. 1 shows a perspective view of a seat adjustment device according to a first embodiment of the present invention.
Figure 2A:
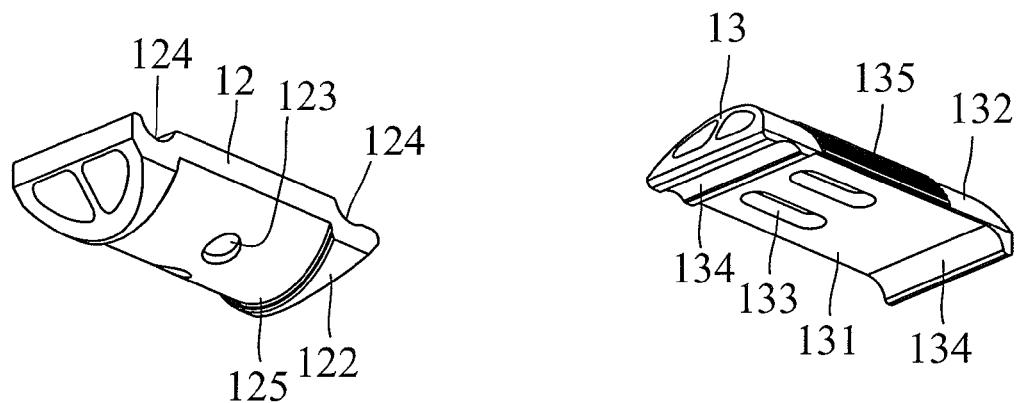
FIG. 2A shows another perspective view of first and second clamp blocks of the seat adjustment device of FIG. 1.
Figure 2:
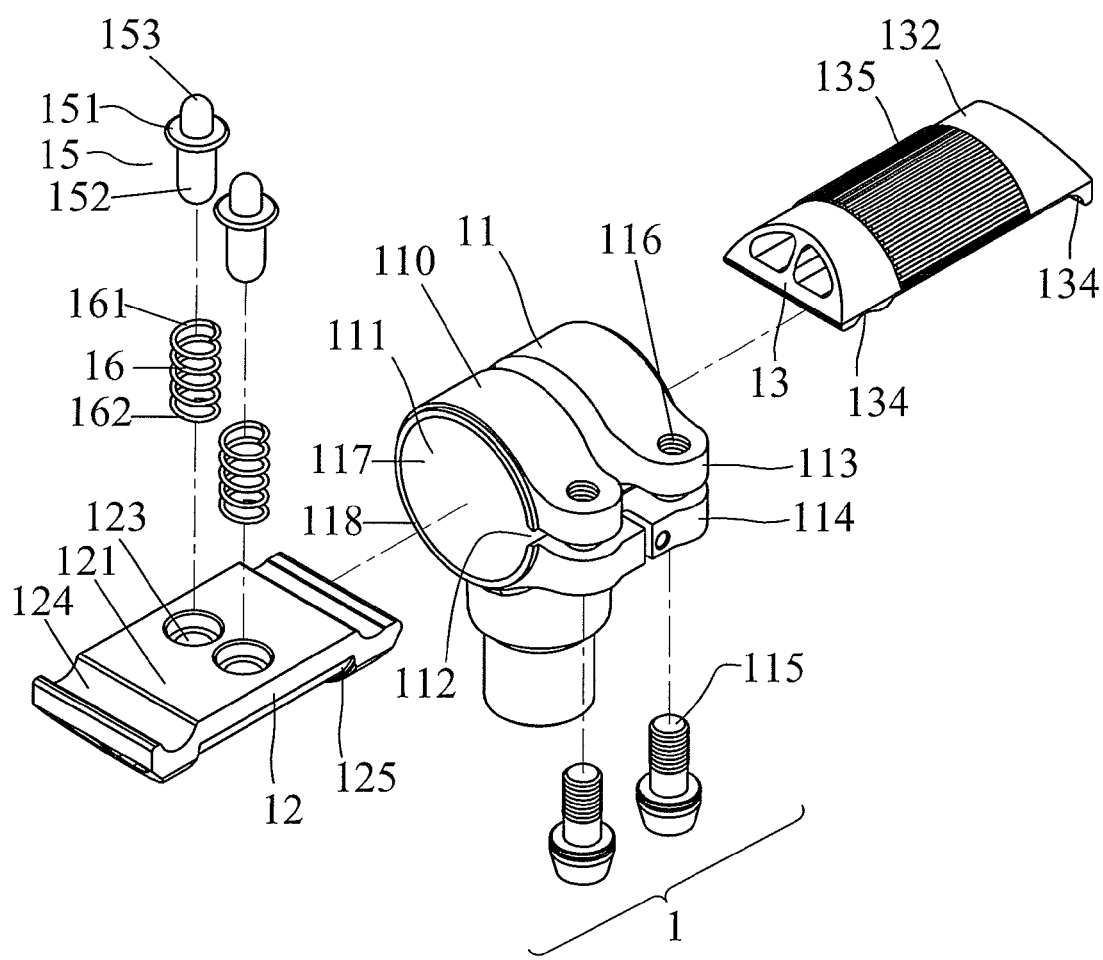
FIG. 2 is an exploded perspective view of the seat adjustment device of FIG. 1.

A seat adjustment device of a first embodiment of the present invention is shown in FIGS. 1 through 11 of the drawings and generally designated 1. The seat adjustment device 1 includes a holding base 11, a first clamp block 12, and a second clamp block 13.

The holding base 11 is adapted to be engaged on a top of a support tube 2 for a seat 3. The holding base 11 includes a ring body 110 having an inner wall 117 with C-shaped cross-sections. A through-hole 111 is defined in the ring body 110 and extends in an axial direction. The ring body 110 includes first and second ends 113 and 114 spaced in a circumferential direction. A gap 112 is defined between the first end 113 and the second end 114. The first and second ends 113 and 114 are respectively formed with a screw hole 116 through which a screw 115 is threadedly extended to combine the first end 113 with the second end 114 so that the ring body 110 can be tightened or loosened.

The first clamp block 12 is received in through-hole 111 of the holding base 11 and includes a first face 122 abutting the inner wall 117 of the ring body 110 and a second face 121 opposed to the first face 122. The second face 121 of first clamp block 12 is flat. A first recessed portion 124 is formed in each of two sides of the second face 121 and extends perpendicular to the axial direction. The second face 121 is further formed with two first slots 123 spaced from each other and located between the two first recessed portions 124 in the axial direction. The first face 122 of the first clamp block 12 is an arc and formed with a groove 125. The groove 125 includes two ends 126 abutting two sides 118 of the ring body 110 so that movement of the first clamp block 12 in the axial direction is limited (see FIG. 3), but movement of the first clamp block 12 relative to the holding base 11 in the circumferential direction of ring body 110 is allowed.

The second clamp block 13 is received in the through-hole 111 of the holding base 11 and includes a first face 132 abutting the inner wall 117 of the ring body 110 and a second face 131 opposed to the first face 132. The first face 132 of the second clamp block 13 is an arc and formed with a plurality of ribs 135. The ribs 135 extend parallel to the axial direction and abut on the inner wall 117 of the ring body 110. The second face 131 of second clamp block 13 is flat and spaced from the second face 121 of first clamp block 12. The second face 131 of second clamp block 13 is formed with second recessed portions 134 at two sides thereof, and two second slots 133 intermediate the second recessed portions 134 in the axial direction. Each second slot 133 extends in the axial direction and aligns with one of the first slots 123 of the first clamp block 12. A pin 15 is provided between aligned first and second slots 123 and 133. Each pin 15 includes a first end 152 inserted in the first slot 123, and a second end 153 inserted in the second slot 133 so that the second clamp block 13 can be moved relative to the first clamp block 12 in the axial direction along a length of the second slot 133 (see FIGS. 3 and 5). According to a position of second clamp block 13 relative to the first clamp block 12, the second recessed portions 134 of second clamp block 13 may be aligned with (see FIG. 3) or spaced from the first recessed portions 124 of first clamp block 12 (see FIG. 5). When the second recessed portions 134 are spaced from first recessed portions 124 (see FIG. 7), support rods 31 of the seat 3 can be mounted in the holding base 11 for assembly or removed for disassembly. When the second recessed portions 134 are respectively aligned with the first recessed portions 124, two bar clamping spaces 14 with round sections are respectively formed, allowing support rods 31 to be clamped in the holding base 11 (see FIG. 8). It is appreciated that the second face 121 of first clamp block 12 can includes only a first slot 123, and the second face 131 of second clamp block 13 can also includes only a second slot 133.

The seat adjustment device 1 further includes at least one resilient member 16 provided between the first and second clamp blocks 12 and 13 to exert a bias pressure towards the inner wall 117 of ring body 110 to the first and second clamp blocks 12 and 13. Thus, the first and the second clamp blocks 12 and 13 can respectively stay tightly close to the inner wall 117 of ring body 110. In the preferred form shown, the seat adjustment device 1 includes two resilient members 16. Each resilient member 16 is a spring and mounted around one of the pins 15. Each pin 15 includes a flange 151 intermediate first and second ends 152 and 153. Each resilient member 16 includes an upper end 161 abutting against flange 151 of one of the pins 15, and a lower end 162 inserted into one of the first slots 123 of first clamp block 12.

Figure 5:
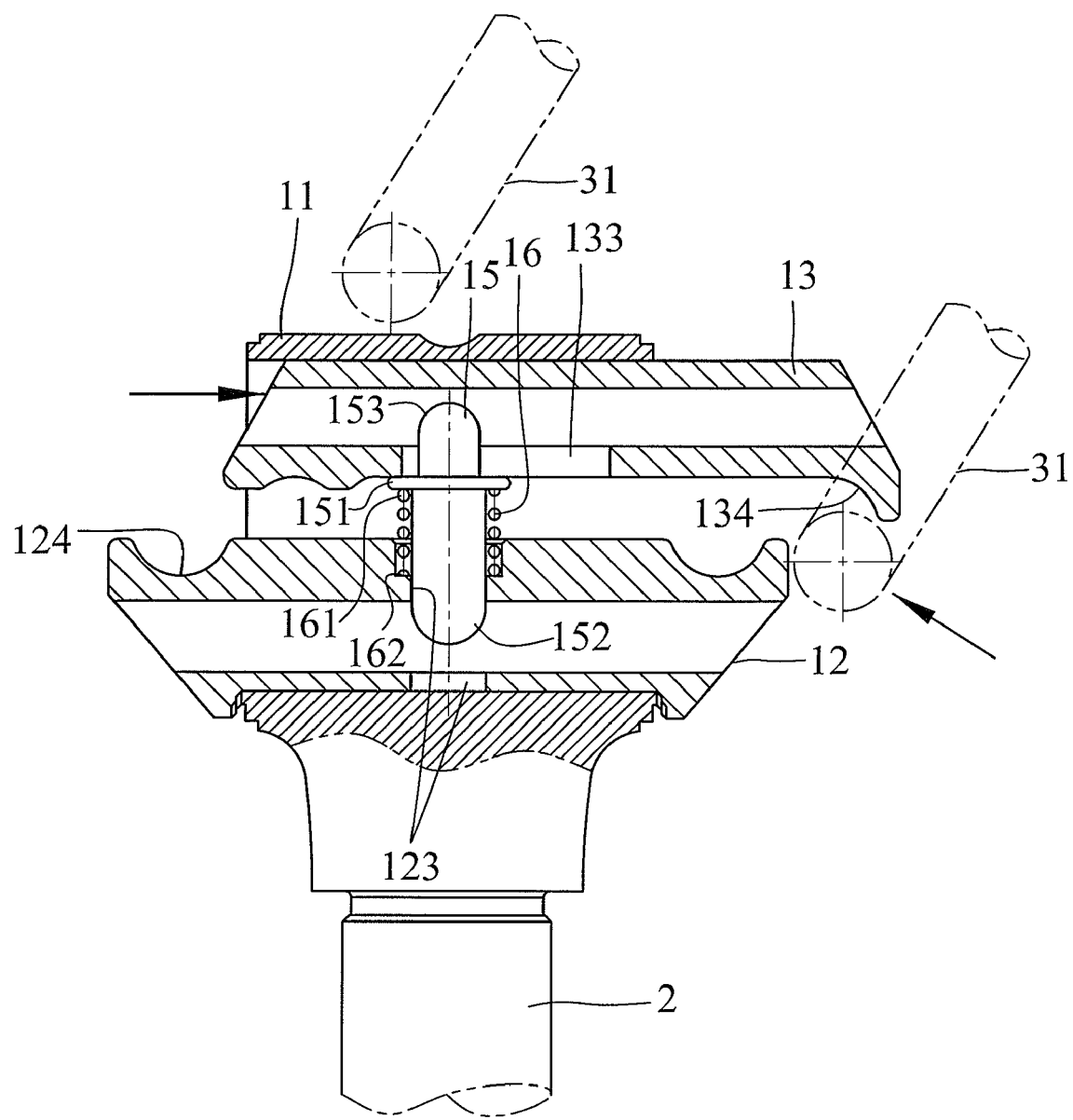
FIG. 5 is a cross-sectional view similar to FIG. 3, illustrating the second clamp block that is moved relative to the first clamp block and a support rod that is ready to combine.
Figure 6:
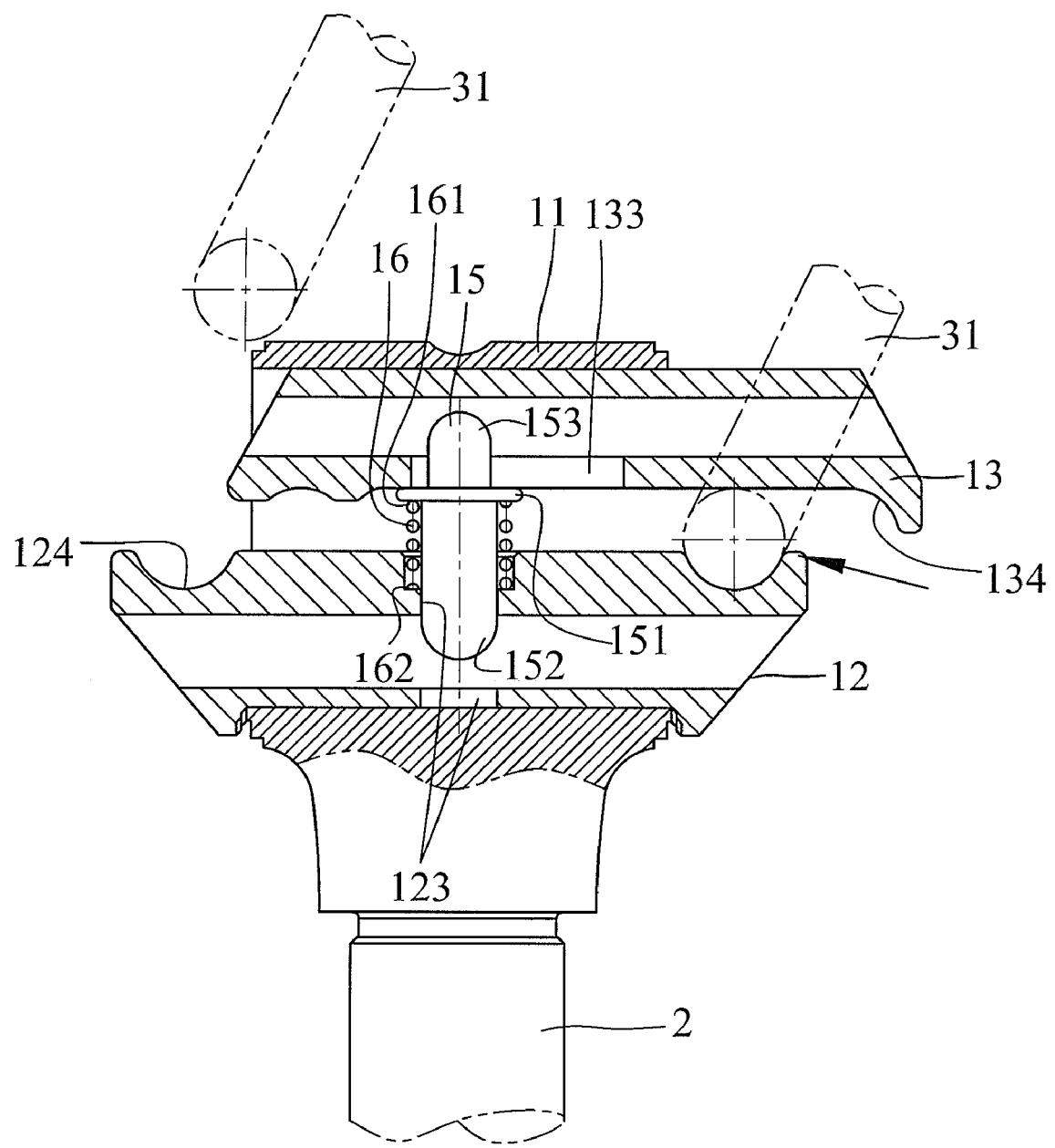
FIG. 6 is a cross-sectional view similar to FIG. 5, illustrating the support rod of FIG. 5 that is forced into a recessed portion of the first clamp block.
Figure 7:
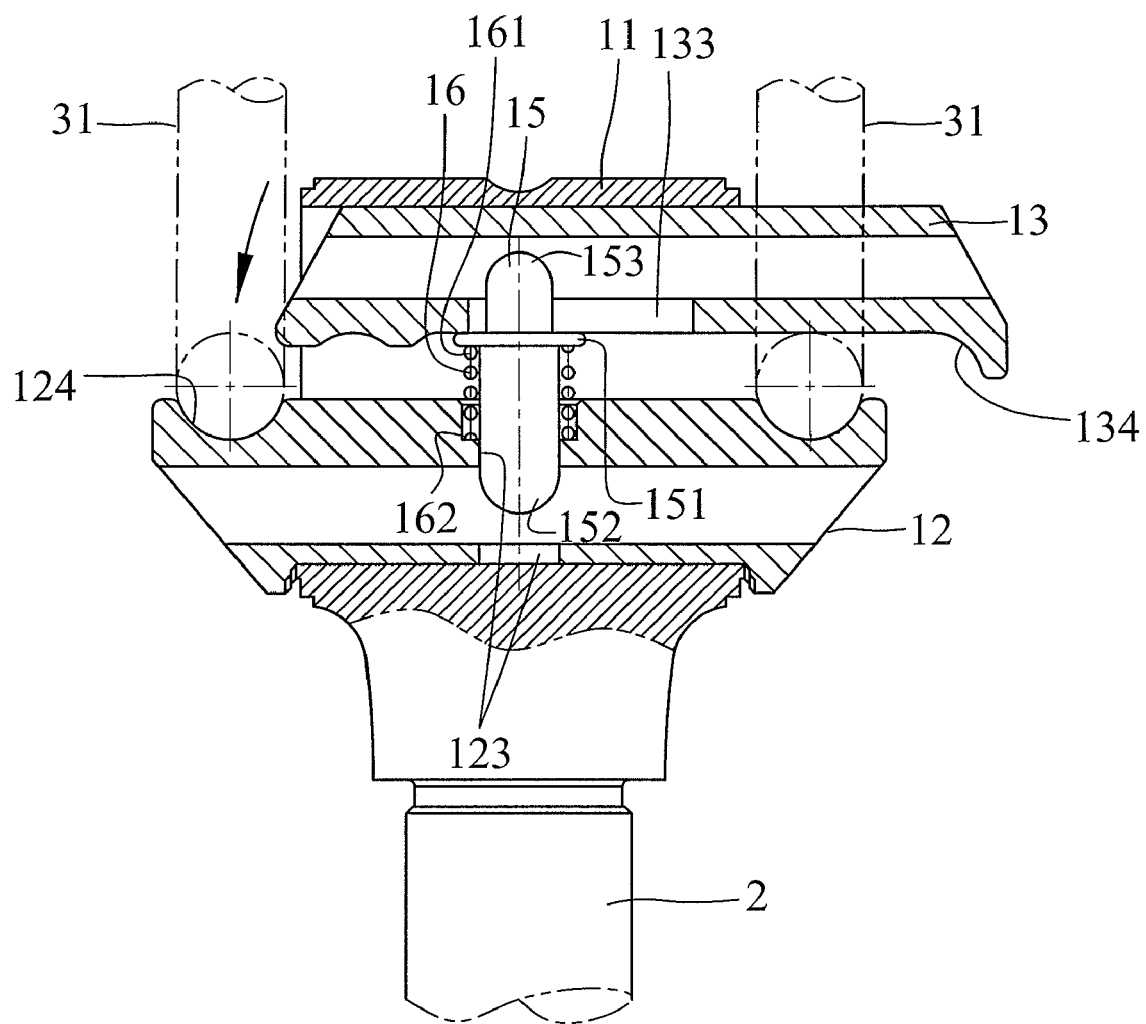
FIG. 7 is a cross-sectional view similar to FIG. 6, illustrating two support rods of FIG. 6 that are forced into two recessed portions of the first clamp block.
Figure 8:
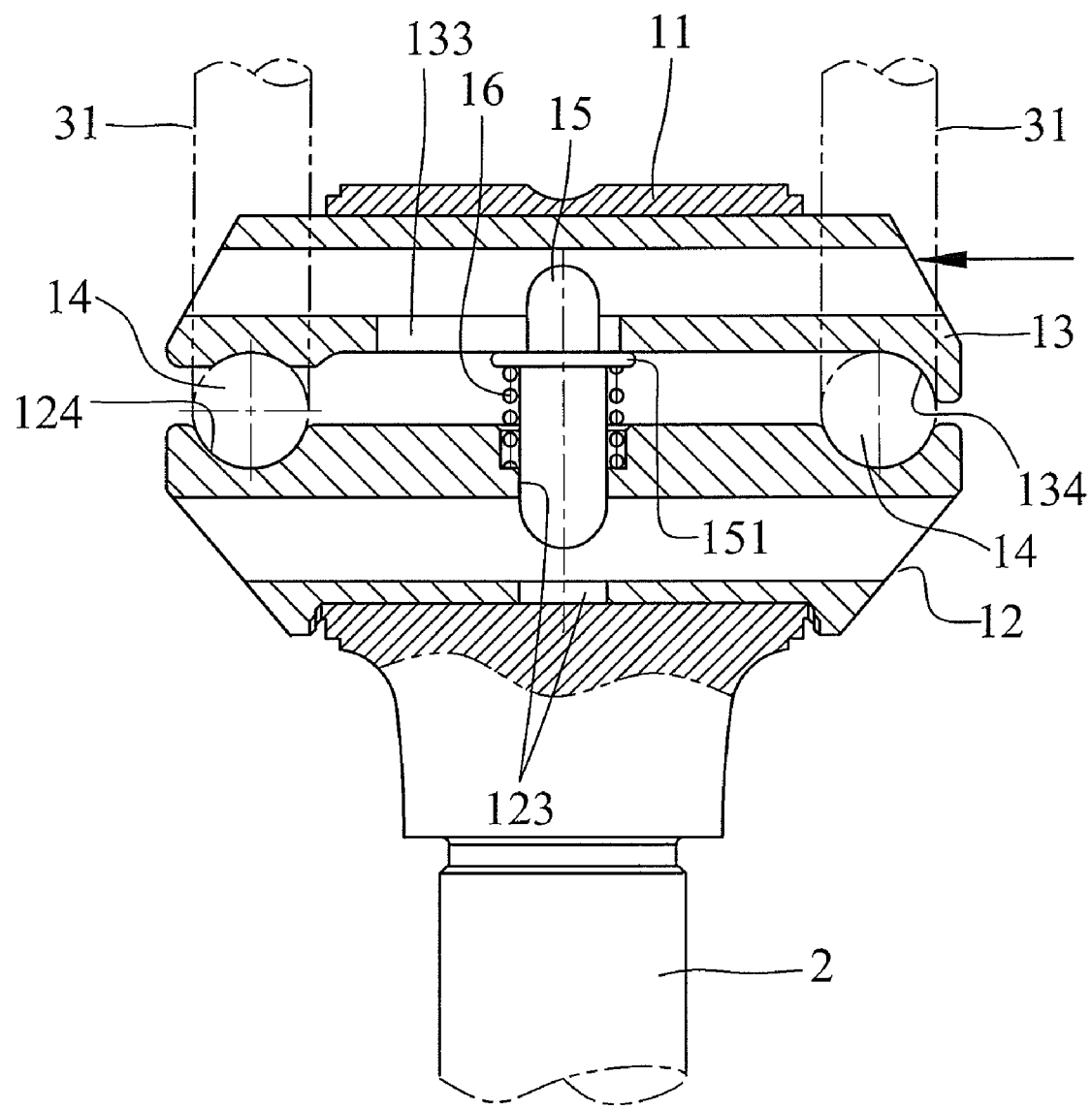
FIG. 8 is a cross-sectional view similar to FIG. 7, illustrating the second clamp block of FIG. 7 that restores to clamp the support rods.
Figure 9:
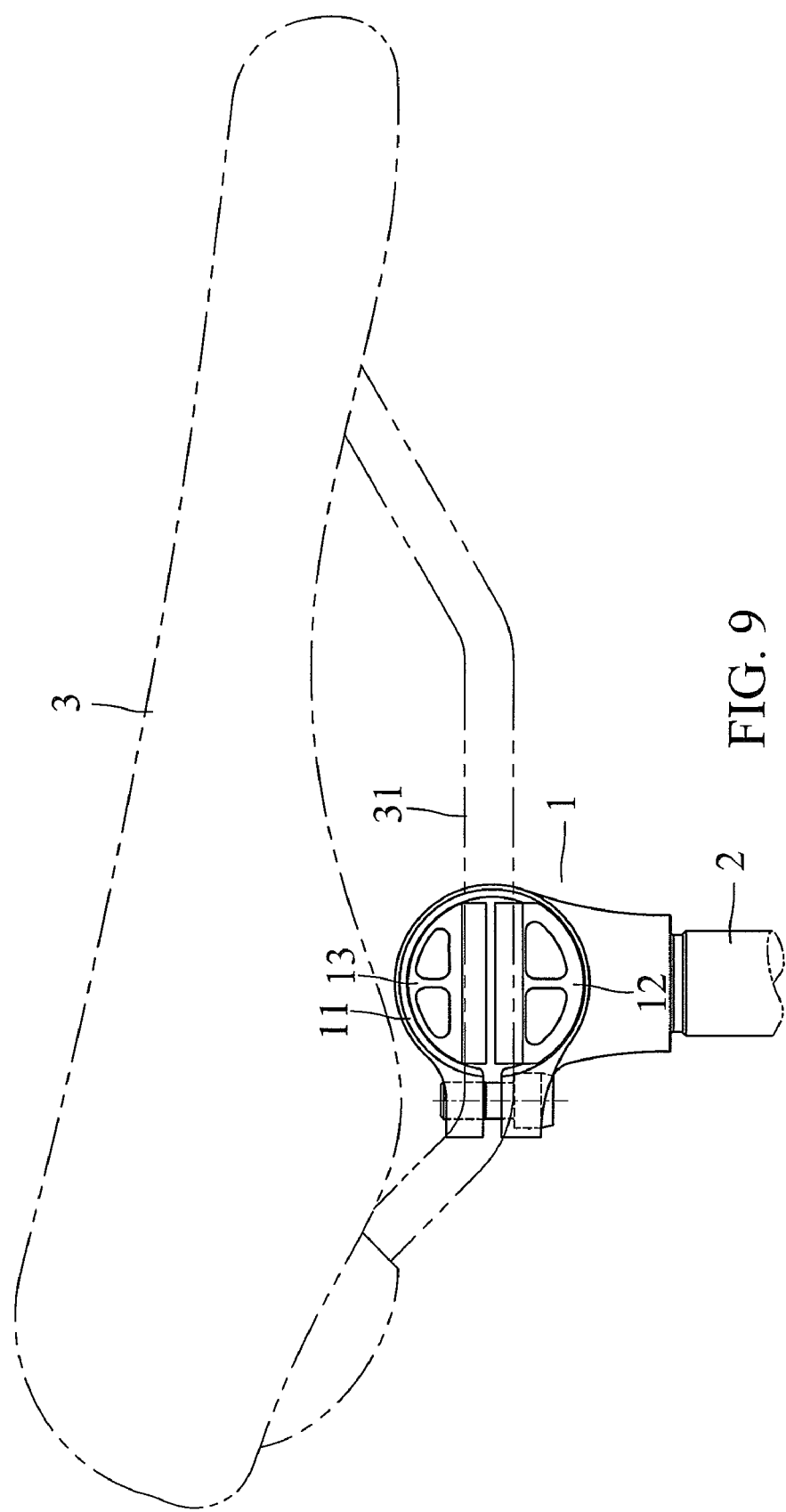
FIG. 9 is a schematic side view of FIG. 8.

In assembly, the first and second ends 113 and 114 of the ring body 110 are first released so that the second clamp block 13 can be moved relative to the first clamp block 12 (see FIG. 5). At this time, the first and second clamp blocks 12 and 13 are biased by the resilient members 16 to be in close contact with the inner wall 117 of the ring body 110. Then, one of the support rods 31 is forced into a first recessed portion 124 of the first clamp block 12 (see FIG. 6). Next, another support rod 31 is forced into another first recessed portion 124 of the first clamp block 12 (see FIG. 7). Next, the second clamp block 13 is shifted to return for making the two support rods 31 to be clamped in the bar clamping spaces 14 (see FIGS. 8 and 9).

Figure 10:
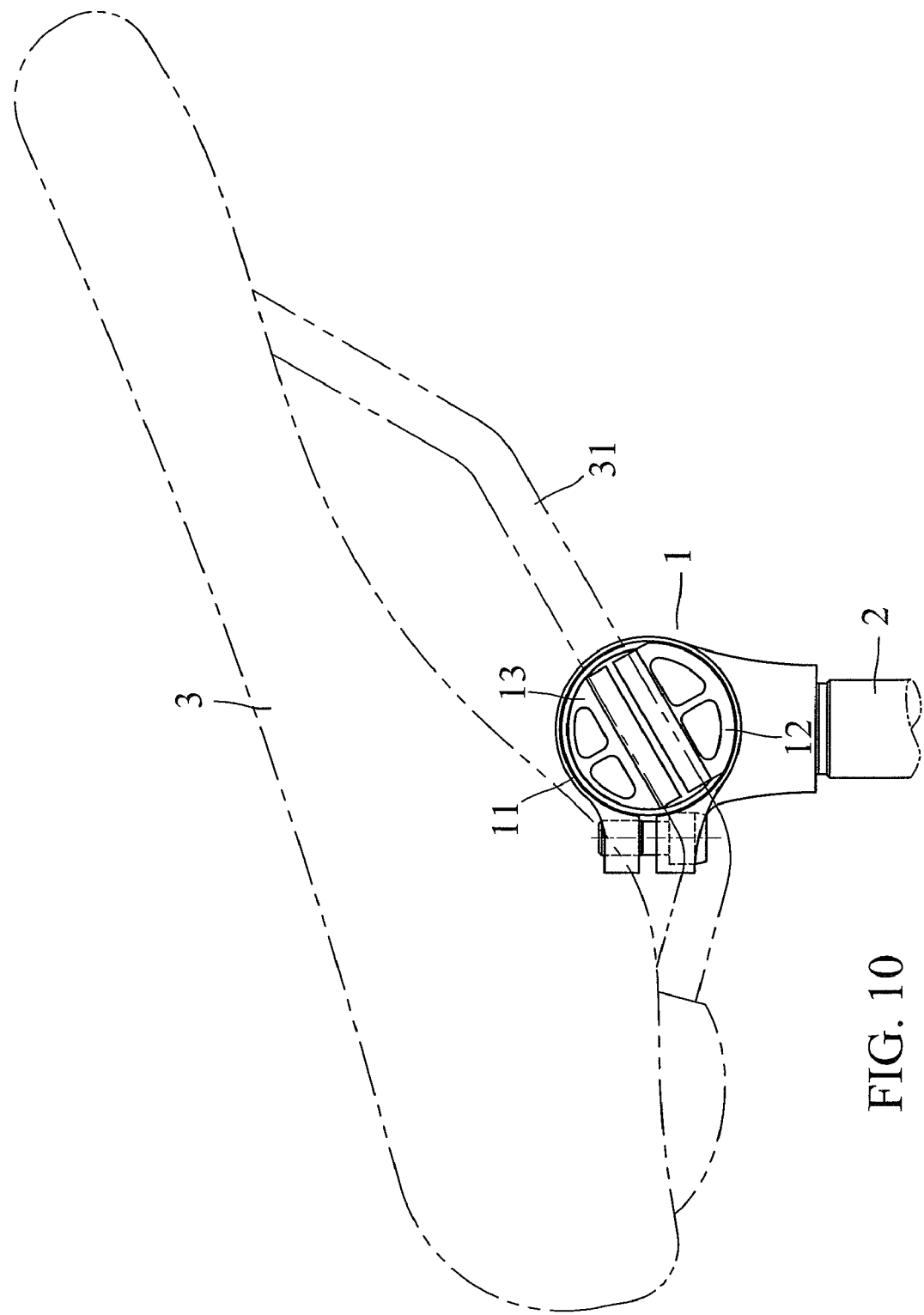
FIG. 10 is a schematic view illustrating the support rods of FIG. 9 that counterclockwise move.
Figure 11:
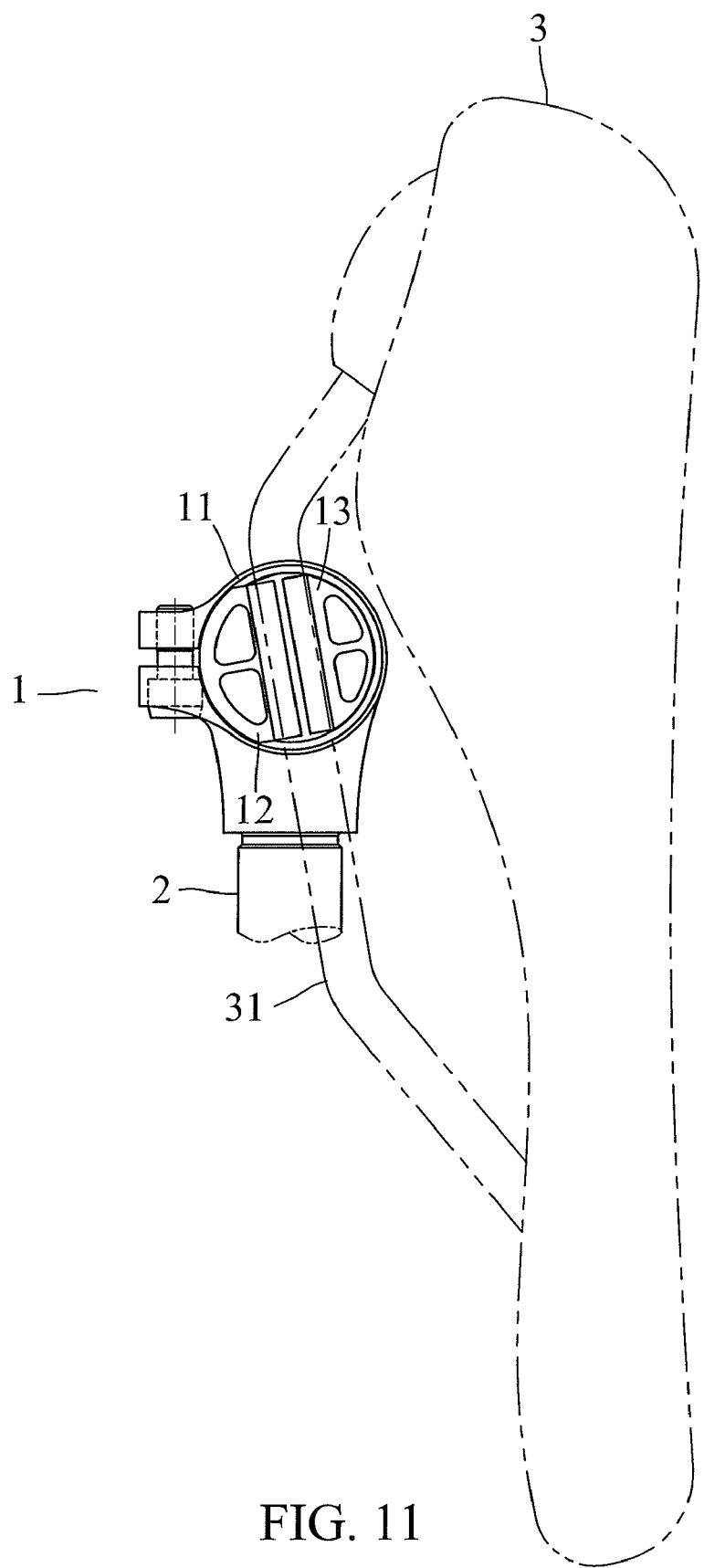
FIG. 11 is a schematic view illustrating the support rods of FIG. 9 that clockwise move.

The seat 3 can be adjusted at a significantly increasing angle. With reference to FIG. 10, when the first and second ends 113 and 114 of the ring body 110 are released, the first and second clamp blocks 12 and 13 can be randomly pivoted in the through-hole 111 of ring body 110 of holding base 11 for adjustment of a riding angle of the seat 3. With reference to FIG. 11, the seat 3 can be adjusted to approximately parallel to the support tube 2 for folding the bike during transportation.

With the resilient members 16 provided between the first and second clamp blocks 12 and 13, the first face 122 of first clamp block 12 and the first face 132 of second clamp block 13 are made to abut on the inner wall 117 of holding base 11. Thus, when the support rods 31 are assembled, the first and second clamp blocks 12 and 13 will not become loose to collide with each other and to cause noise, achieving easy assembly of the support rods 31 in the holding base 11. Furthermore, with the ribs 135 provided on the first face 132 of second clamp block 13, the non-slip effect is brought to contact surfaces of the second clamp block 13 and the holding base 11.

Figure 12:
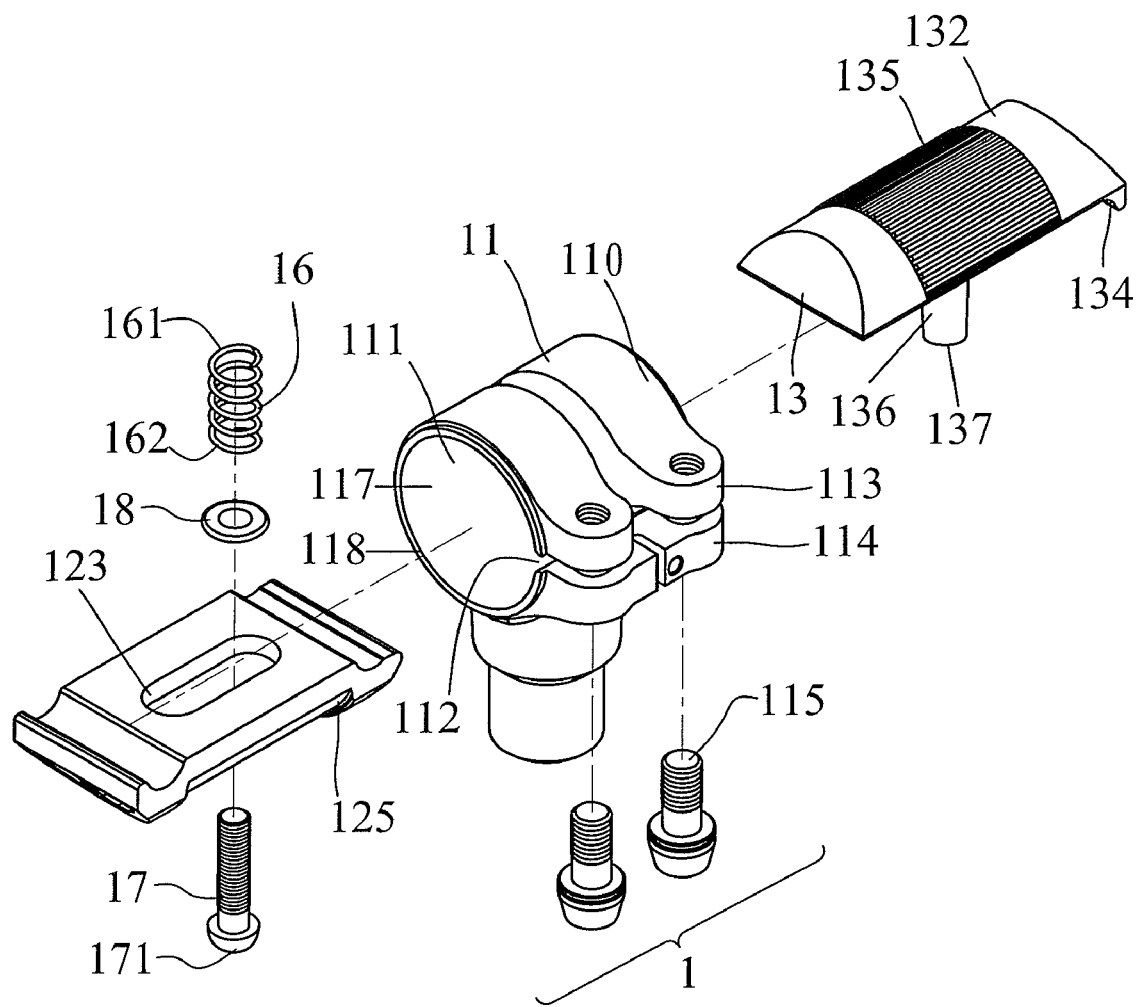
FIG. 12 is an exploded perspective view of a seat adjustment device according to a second embodiment of the present invention.
Figure 14:
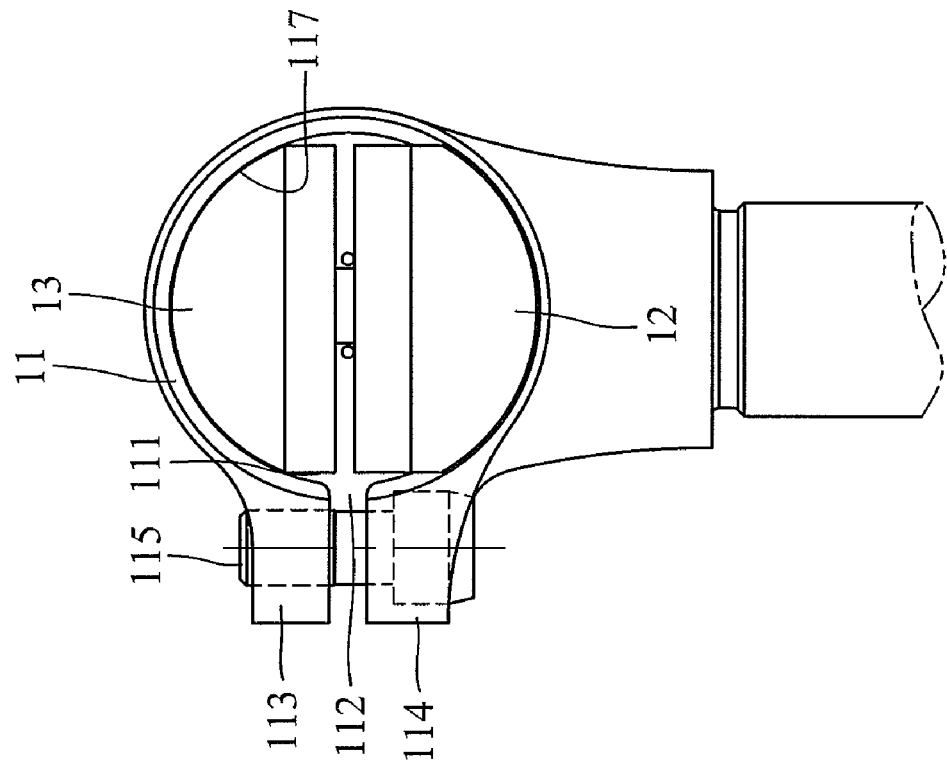
FIG. 14 is a side view of the seat adjustment device of FIG. 13.
Figure 13:
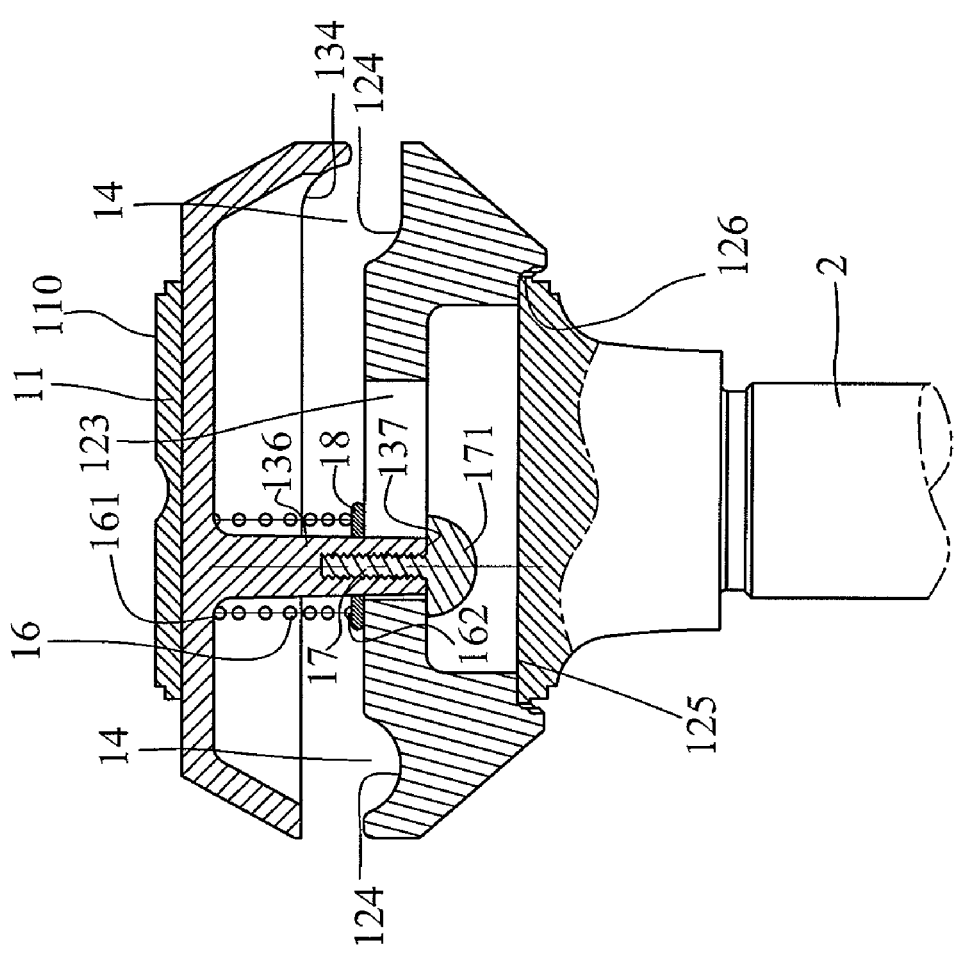
FIG. 13 is a cross-sectional view of the seat adjustment device of FIG. 12.
Figure 15:
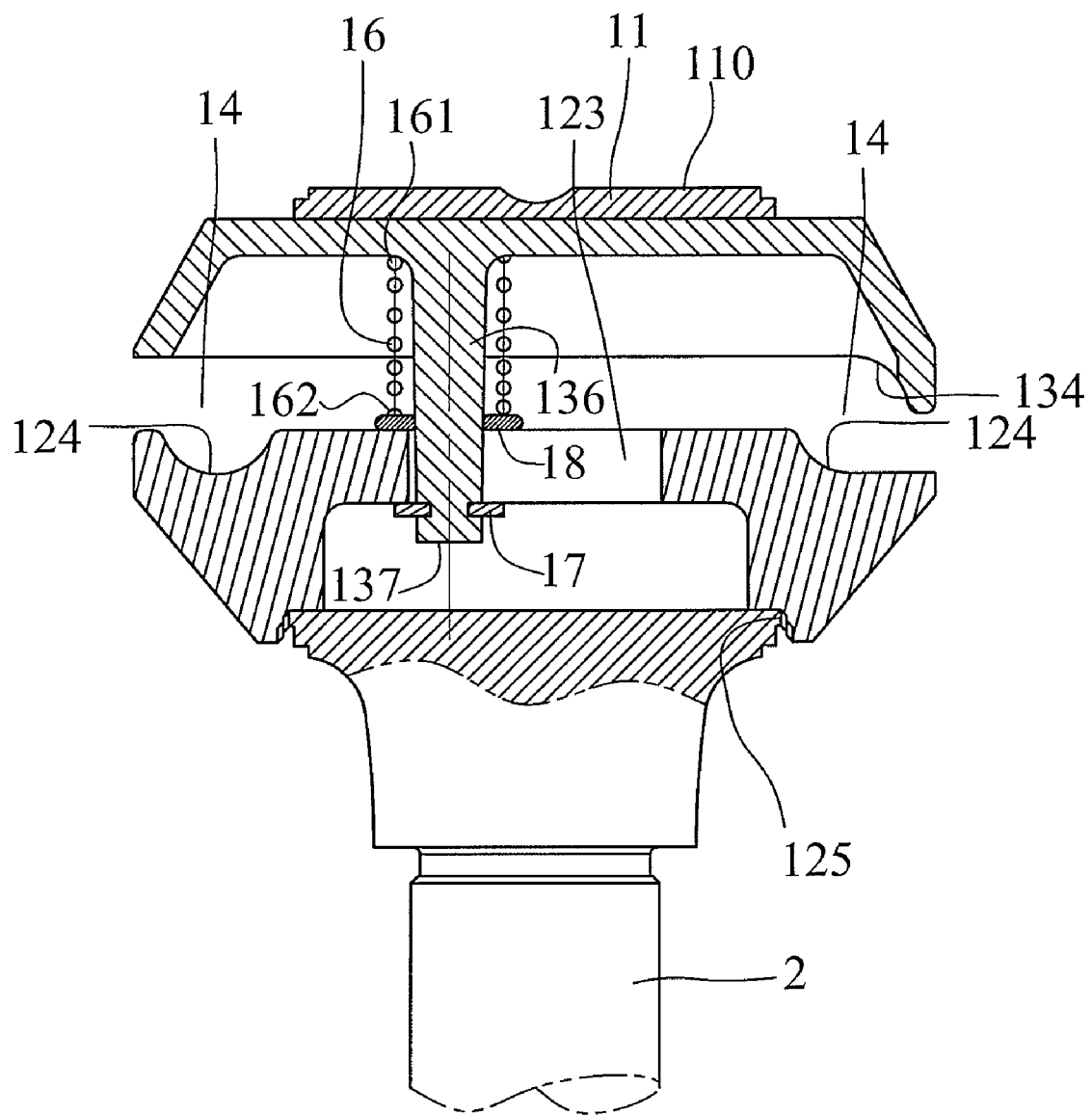
FIG. 15 is a cross-sectional view similar to FIG. 13, illustrating that a screw shown in FIG. 13 is replaced with a retaining ring.

Now that the basic teachings of the present invention have been explained, many extensions and variations will be obvious to one having ordinary skill in the art. The seat adjustment device 1 shown in FIGS. 12 through 14 is a modification of that shown in FIGS. 1 through 11. Description of the parts of seat adjustment device 1 shown in FIGS. 12 through 14 identical to those shown in FIGS. 1 through 11 is omitted. In particular, first clamp block 12 includes a first slot 123 extending in the axial direction to substitute for the two first slots 123 in the first embodiment. Furthermore, second clamp block 13 is formed with a combining pillar 136 extending outwards from the second face 131 to substitute for the two second slots 133 and the pins 15 in the first embodiment. An outer end 137 of combining pillar 136 is engaged in the first slot 123 of first clamp block 12 so that the second clamp block 13 can be moved relative to the first clamp block 12 in the axial direction according to a specified length of the first slot 123. Resilient member 16 is mounted around the combining pillar 136 and between the first and second clamp blocks 12 and 13 to bias the first and second clamp blocks 12 and 13 towards the inner wall 117 of the ring body 110. Further, a connecting member 17, such as a screw, is secured to the outer end 137 of combining pillar 136 to block the combining pillar 136 from escaping from the first clamp block 12. The screw includes a head 171 abutting against the first face 122 of first clamp block 12. A gasket 18 is mounted on the second face 121 of first clamp block 12 for abutting by the resilient member 16. The connecting member 17 used to block the combining pillar 136 from escaping from the first clamp block 12 is not limited to a screw. With reference to FIG. 15, the connecting member 17 is a retaining ring secured to the outer end 137 of combining pillar 136 to block the combining pillar 136 from escaping from the first clamp block 12.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A seat adjustment device for a bike, comprising:
   a holding base adapted to be mounted on a top of a support tube for a seat, with the holding base including a ring body having an inner wall and a through-hole extending in an axial direction;
   a first clamp block received in the through-hole of the holding base and including a first face abutting the inner wall of the ring body and a second face opposed to the first face of the first clamp block;
   a second clamp block received in the through-hole of the holding base and including a first face abutting the inner wall of the ring body and a second face opposed to the first face of the second clamp block, with the second face of the second clamp block facing and spaced from the second face of the first clamp block, with the second clamp block being moveable relative to the first clamp block in the axial direction; and
   a resilient member mounted between the first and second clamp blocks to bias the first and second clamp blocks towards the inner wall of the ring body.

2. The seat adjustment device as claimed in claim 1, with the first face of the first clamp block being an arc and formed with a groove, and with the groove including two ends abutting two sides of the ring body.

3. The seat adjustment device as claimed in claim 2, with the second face of the first clamp block formed with a first slot, with the second face of the second clamp block formed with a second slot extending in the axial direction, with the second slot aligning with the first slot of the first clamp block, with a pin provided between the first and second clamp blocks, with the pin including a first end inserted in the first slot of the first clamp block, a second end inserted in the second slot of the second clamp block, and a flange intermediate the first and second ends of the pin, and with the resilient member being a spring and mounted between the flange and the first end of the pin.

4. The seat adjustment device as claimed in claim 3, with the second face of the first clamp block formed with two first recessed portions, with the second face of the second clamp block formed with two second recessed portions, with two bar clamping spaces being defined by the first recessed portions and the second recessed portions when the second recessed portions of second clamp block respectively align with the first recessed portions of the first clamp block, with the ring body including first and second ends spaced in a circumferential direction, and with the first face of the second clamp block being an arc and formed with a plurality of ribs.

5. The seat adjustment device as claimed in claim 1, with the second face of the first clamp block formed with a first slot extending in the axial direction, with the second face of the second clamp block formed with a combining pillar, with the combining pillar including an outer end received in the first slot of the first clamp block and engaged with a connecting member to block the combining pillar from escaping from the first clamp block, and with the resilient member being a spring and mounted around the combining pillar.

6. The seat adjustment device as claimed in claim 5, with the connecting member being a screw including a head abutting against the first face of the first clamp block.

7. The seat adjustment device as claimed in claim 5, with the connecting member being a retaining ring abutting against the first face of the first clamp block.

8. The seat adjustment device as claimed in claim 5, with the first face of the first clamp block being an arc and formed with a groove, with the groove including two ends abutting two sides of the ring body, with the second face of the first clamp block formed with two first recessed portions, and with the second face of the second clamp block formed with two second recessed portions, with two bar clamping spaces defined by the first recessed portions and the second recessed portions when the second recessed portions of second clamp block respectively align with the first recessed portions of the first clamp block.

* * * * *